Feb. 5, 1929.
C. MACMILLAN
1,701,382
ELECTRIC SHIP PROPULSION
Filed March 21, 1924　　2 Sheets-Sheet 2
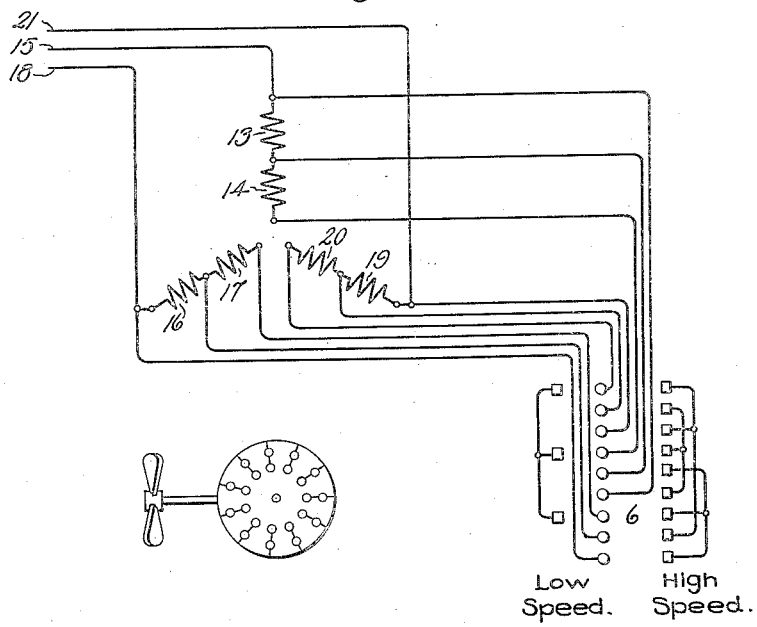
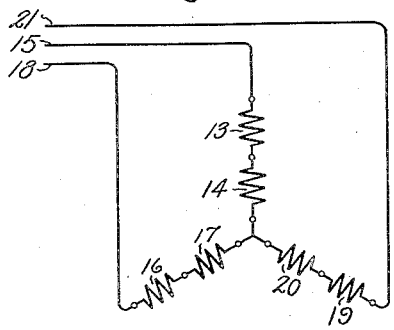
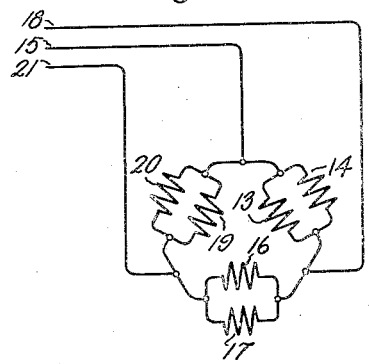
Inventor:
Campbell Macmillan,
by His Attorney.

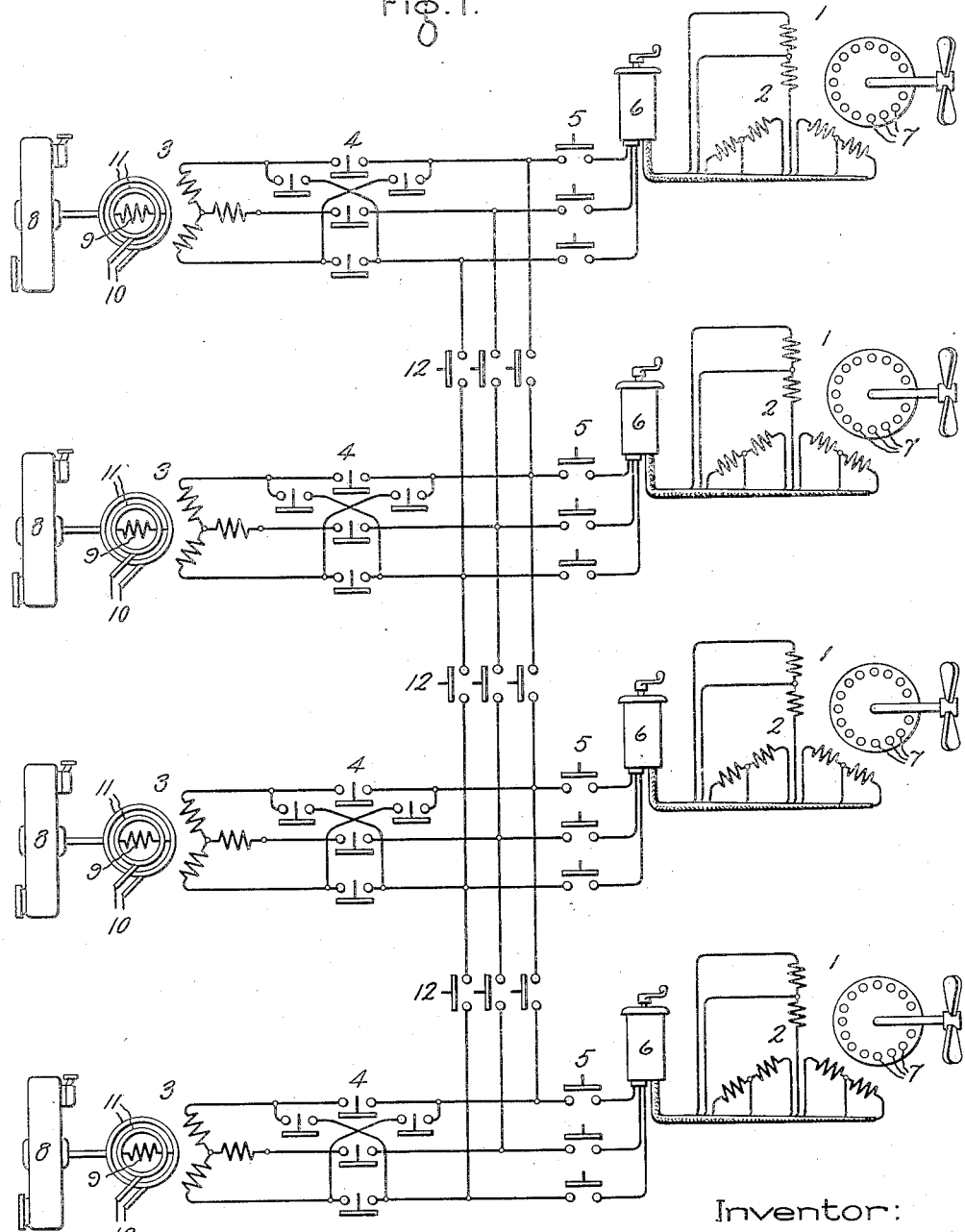

Patented Feb. 5, 1929.

1,701,382

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ELECTRIC SHIP PROPULSION.

Application filed March 21, 1924. Serial No. 700,972.

My invention relates to electric ship propulsion, and has for its object the provision of an improved propulsion system which is capable both of being controlled in a simple manner and of being efficiently operated at the different driving speeds of the ship.

The power consumed in driving a ship varies approximately as the cube of the ship's driving speed. For this reason the torque required to be exerted by the propeller motors varies over a wide range. Thus, if the ship is to be driven at speeds in the ratio of 1 to 2, for example, the propeller motors will be required to supply at the higher speed an amount of power about eight times that required at the lower speed.

Where there are two or more motors per propeller shaft it is of course possible to disconnect a part of the motors on each shaft during low speed operation and to operate the remaining motors at a fairly high efficiency. It is not possible to do this in cases where a single motor per shaft is used and, if induction motors are used, the motor efficiency at the lower speeds is unsatisfactory.

The induction motor is required to establish its own field and for this reason always operates at a power factor which is somewhat below unity. Due to the fact that the value of its magnetizing current is dependent upon the voltage applied to its primary coils rather than upon the motor load, the power factor of this motor is especially bad when it is operated at light loads. In the application of induction motors to ship propulsion it is therefore desirable to provide means for reducing the voltage per coil when the motor is operated to drive the ship at its cruising speed. In accordance with my invention this is accomplished by changing the connections of the motor primary coils from two circuit delta to single circuit Y.

My invention will be better understood from the following description when considered in connection with the accompanying drawing, and its scope will be pointed out in the appended claims.

Referring to the drawing, Fig. 1 shows a system of ship propulsion in which my invention has been embodied: and Figs. 2, 3 and 4 show certain details in the connections of the motor primary coils.

Fig. 1 shows four similar units each comprising a propeller motor 1 having its primary winding 2 arranged to be supplied with current from a generator 3 through reversing switches 4, disconnect switches 5 and a controller 6 for controlling the interconnection of the various coils in the winding 2. Each of the motors 1 is provided with a secondary winding shown as a squirrel cage 7. A prime mover shown as a steam turbine 8 is provided for driving the generator rotor member. Upon this member is wound the field winding 9 to which exciting current may be supplied through leads 10 and slip rings 11. Suitable switches 12 are provided for interconnecting the various units.

Fig. 2 shows how the controllers 6 are utilized to alter the connections of the coils 13, 14, 16, 17, 19 and 20 of a primary winding 2. It will be observed that the outer ends of the coils 13, 16 and 19 are permanently connected to the lines 15, 18 and 21 through which current is supplied to the motors from the generators 3. The two operating positions of the controller 6 are indicated by the legends "Low speed" and "High speed". When the controller is moved to its "Low speed" position the inner ends of the coils 14, 17 and 20 are interconnected to form a single circuit star or Y-connection as indicated in Fig. 3. With this connection the voltage per coil is comparatively low due both to the series arrangement of the coils and to the fact that they are connected in star. As a result of this reduction in the voltage per coil the magnetizing current of the motor is decreased and the power factor at which the motor operates is correspondingly improved.

To increase the motor speed the controller 6 is moved to its "High speed" position. This opens the "Low speed" connection at the Y point and connects these same points to the line. The midpoints of the series connected coils of each phase are also connected at this time to the line. In this position the various coils are interconnected in a double delta circuit as shown in Fig. 4 and the full line voltage is applied to each coil. The reversal of current in half of the coils in each phase results in halving the number of poles and this gives the higher speed of operation. The motors are thus arranged to exert their maximum torque.

When it is desired to reverse the direction of propeller rotation the speed and excitation of the generators 3 is reduced, the switches 4 are operated to reverse the phase rotation between the generators and motors, the controller 6 is moved to its "Low speed" position and exciting current is supplied to the generator field windings 9.

With the "Low speed" connection, the effective impedance of the motors is increased. This makes it possible for the generators to deliver more nearly their maximum kilovolt amperes and, with the proper increase in the voltage of the generators, insures adequate torque for the purpose of reversal. This makes it possible to utilize motors designed to operate at high power factor while running although the motor torque and power factor at starting may be comparatively low and is the means of effecting marked economies in the operation of the ship as will be readily understood by those skilled in the art.

What I claim as new and desire to secure by Letters Patent of the United States is:—

1. The method of operating a three-phase electric ship propulsion system in which there is only one propeller driving motor per propeller shaft, such motor having a plurality of winding coils adapted to be interconnected to produce two pole members in the ratio of 1 to 2, which includes connecting said coils in single circuit star of the higher pole number for low-speed operation and for reversal, and in double circuit delta of the lower pole number for high-speed operation.

2. A three-phase electric ship propulsion system having only one generator per propeller motor and only one driving motor per propeller shaft, such motor having a plurality of winding coils adapted to be interconnected to produce two pole numbers in the ratio of 1 to 2, and means for connecting said coils in single circuit star of the higher pole number for low-speed operation and for reversal, and in double circuit delta of the lower pole number for high-speed operation.

3. The method of bringing up to speed a squirrel cage three-phase motor having a plurality of winding coils in each of its phases which includes first operating the motor with the coils connected in single circuit star to produce one number of poles, and then operating the motor with the coils connected in double circuit delta with half the coils reversed to produce half such number of poles.

4. In combination, a three-phase induction motor having two groups of winding coils per phase, the free ends of three of said groups being respectively permanently connected to terminals constituting line terminals, the other ends of said three groups being permanently connected to the respective ends of the other three of said groups and provided with terminals constituting intermediate terminals, means for connecting the free ends of said other groups together to connect said two groups of windings in single circuit star for one pole number, means for connecting said last-mentioned free ends respectively to the corresponding line terminals with the star point open, and means for connecting each line terminal respectively to the next intermediate terminal to connect said two groups of windings in double circuit delta for half such pole number.

In witness whereof, I have hereunto set my hand this 20th day of March, 1924.

CAMPBELL MACMILLAN.

CERTIFICATE OF CORRECTION.

Patent No. 1,701,382.  Granted February 5, 1929, to

CAMPBELL MACMILLAN.

It is hereby certified that error appears in the printed specification of the above numbered patent requiring correction as follows: Page 2, line 26, claim 1, for the word "members" read "numbers"; and that the said Letters Patents should be read with this correction therein that the same may conform to the record of the case in the Patent Office.

Signed and sealed this 5th day of March, A. D. 1929.

M. J. Moore,
Acting Commissioner of Patents.

(Seal)

CERTIFICATE OF CORRECTION.

Patent No. 1,701,382.  Granted February 5, 1929, to

CAMPBELL MACMILLAN.

It is hereby certified that error appears in the printed specification of the above numbered patent requiring correction as follows: Page 2, line 26, claim 1, for the word "members" read "numbers"; and that the said Letters Patents should be read with this correction therein that the same may conform to the record of the case in the Patent Office.

Signed and sealed this 5th day of March, A. D. 1929.

(Seal)

M. J. Moore,
Acting Commissioner of Patents.